(12) United States Patent
Vogle

(10) Patent No.: US 8,679,600 B2
(45) Date of Patent: Mar. 25, 2014

(54) FOOD DRAINAGE BAG

(76) Inventor: Diana K. Vogle, Bracey, VA (US)

( * ) Notice: Subject to any disclaimer, the term of this patent is extended or adjusted under 35 U.S.C. 154(b) by 375 days.

(21) Appl. No.: 13/233,849

(22) Filed: Sep. 15, 2011

(65) Prior Publication Data

US 2013/0071050 A1    Mar. 21, 2013

(51) Int. Cl.
*B29D 22/00* (2006.01)

(52) U.S. Cl.
USPC ........... 428/34.3; 383/116; 383/117; 525/425

(58) Field of Classification Search
USPC .................. 428/34.3; 383/116, 117; 525/425; 139/384 R, 389; 34/322, 58
See application file for complete search history.

(56) References Cited

U.S. PATENT DOCUMENTS

| | | | |
|---|---|---|---|
| 1,942,086 A | | 1/1934 | Cheatham |
| 3,594,448 A | * | 7/1971 | Birenzvige et al. ........... 524/100 |
| 3,635,653 A | * | 1/1972 | Snider et al. ...................... 8/531 |
| 4,150,674 A | * | 4/1979 | Yung .............................. 442/361 |
| 4,321,756 A | | 3/1982 | Mosely |
| 5,055,509 A | * | 10/1991 | Bhattacharjee et al. ...... 524/136 |
| 6,780,941 B2 | * | 8/2004 | Studholme et al. ........... 525/419 |
| 2004/0198121 A1 | * | 10/2004 | Huang et al. .................. 442/290 |
| 2007/0140600 A1 | * | 6/2007 | Nowak et al. ................. 383/116 |
| 2013/0051712 A1 | * | 2/2013 | Roether et al. ................ 383/117 |
| 2013/0071050 A1 | * | 3/2013 | Vogle ............................ 383/116 |

FOREIGN PATENT DOCUMENTS

DE      34 34 687 A1    4/1986

* cited by examiner

*Primary Examiner* — N. Edwards
(74) *Attorney, Agent, or Firm* — Richard C. Litman

(57) ABSTRACT

The food drainage bag is a flexible drainage bag fabricated from a fine-mesh material having non-stick properties. The bag is utilized to drain excess liquid from frozen or fresh food items. Liquids can be made to drain more quickly from the foods simply gently by squeezing the bag. Alternatively, foods may be allowed to drain naturally if desired. The bag is easily cleaned and may be folded for storage or positioned on a hook to dry when not in use. The interior of the bag may be treated with a non-stick, non-toxic material to further enhance its non-stick properties.

11 Claims, 3 Drawing Sheets

FOOD DRAINAGE BAG

BACKGROUND OF THE INVENTION

1. Field of the Invention

The present invention generally relates to kitchen accessories, and particularly to a food drainage bag for draining liquids from frozen or fresh food items.

2. Description of the Related Art

Modern culinary techniques require the ability to separate food from the liquid in which the food is stored, or from liquid used to clean the food. For example, some frozen foods (spinach, quesadilla mixture, sauerkraut, etc.), when thawed, often contain an amount of liquid that should be separated from the food before the food is cooked and/or eaten. These are just some of the innumerable situations that require drainage in food preparation.

Heretofore, bulky devices, such as wire strainers or rigid colanders, have been employed as the instruments of choice for draining foods. The conventional procedure is to dump the food into the chosen device, place the device into a receptacle (usually, a sink) or on a towel, and wait patiently until the liquid slowly drains away. After use, the bulky device requires some effort to clean and a relatively fair amount of space for storage. In many instances, the food could be drained more efficiently and effectively if the food could be gently manipulated (squeezed) during the draining process. This procedure would be difficult at best when using a strainer or colander. The art would certainly welcome a food draining device that would allow such manipulation, and that would be easy to clean and require very little space for storage when not in use. Thus, a food drainage bag solving the aforementioned problems is desired.

SUMMARY OF THE INVENTION

The food drainage bag is a flexible drainage bag fabricated from a flexible, fine-mesh material having non-stick properties. The bag is utilized to drain excess liquid from frozen or fresh food items. Liquids can be made to drain more quickly from the foods simply by gently squeezing the bag. Alternatively, some foods, such as yogurt, may be allowed to drain naturally without squeezing. The bag is easily cleaned and may be folded for storage, or positioned on a hook to dry when not in use. The interior of the bag may be treated with a non-stick, non-toxic material to further enhance its non-stick properties.

Accordingly, the invention presents a reusable, flexible food drainage device that is effective and efficient. The device is easy to clean and occupies minimum storage space when not in use. The invention provides for improved elements thereof in an arrangement for the purposes described that are inexpensive to manufacture, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
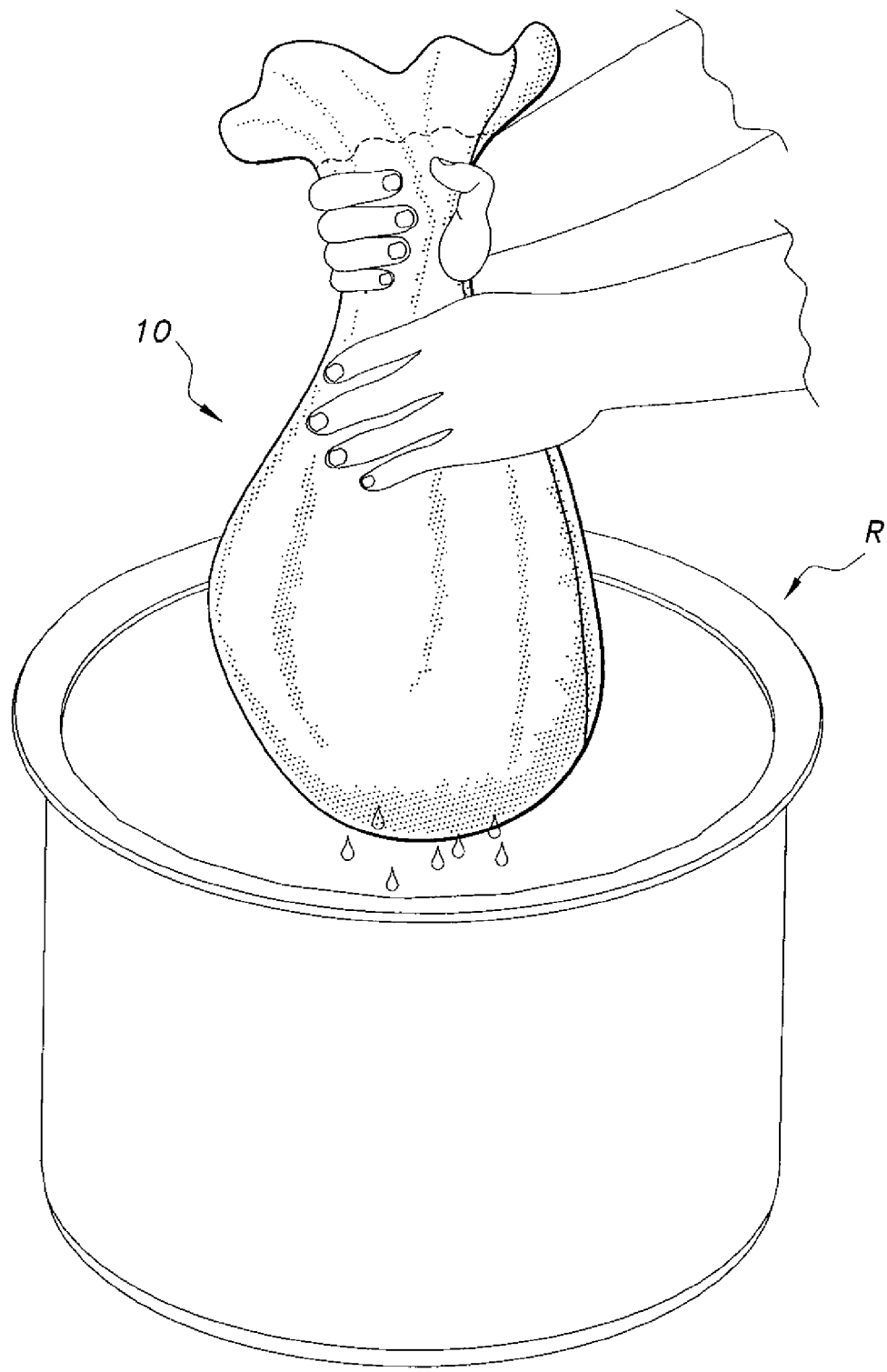
FIG. 1 is an environmental, perspective view of a food drainage bag according to the present invention.
Figure 2:
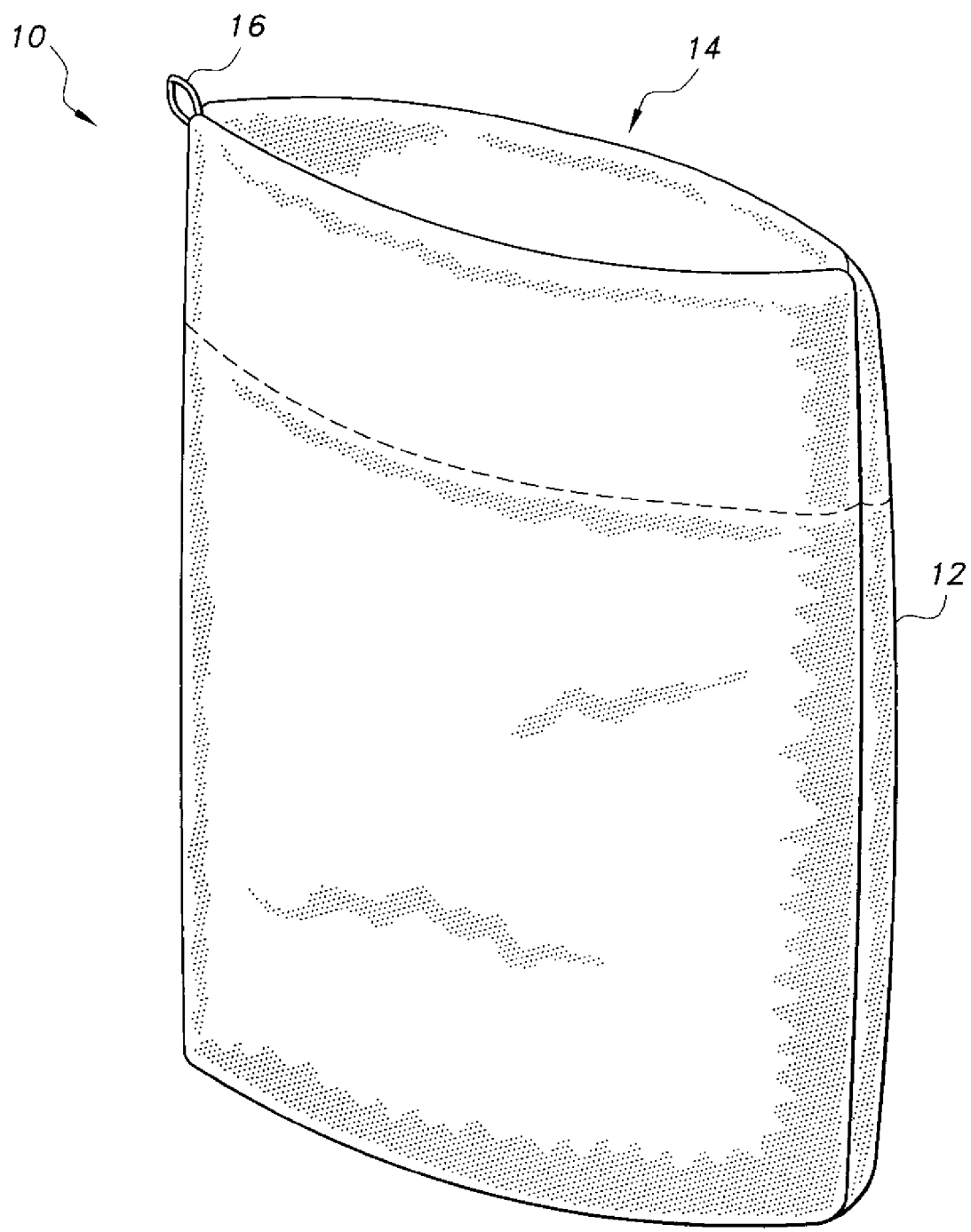
FIG. 2 is perspective view of a food drainage bag according to the present invention.
Figure 3:
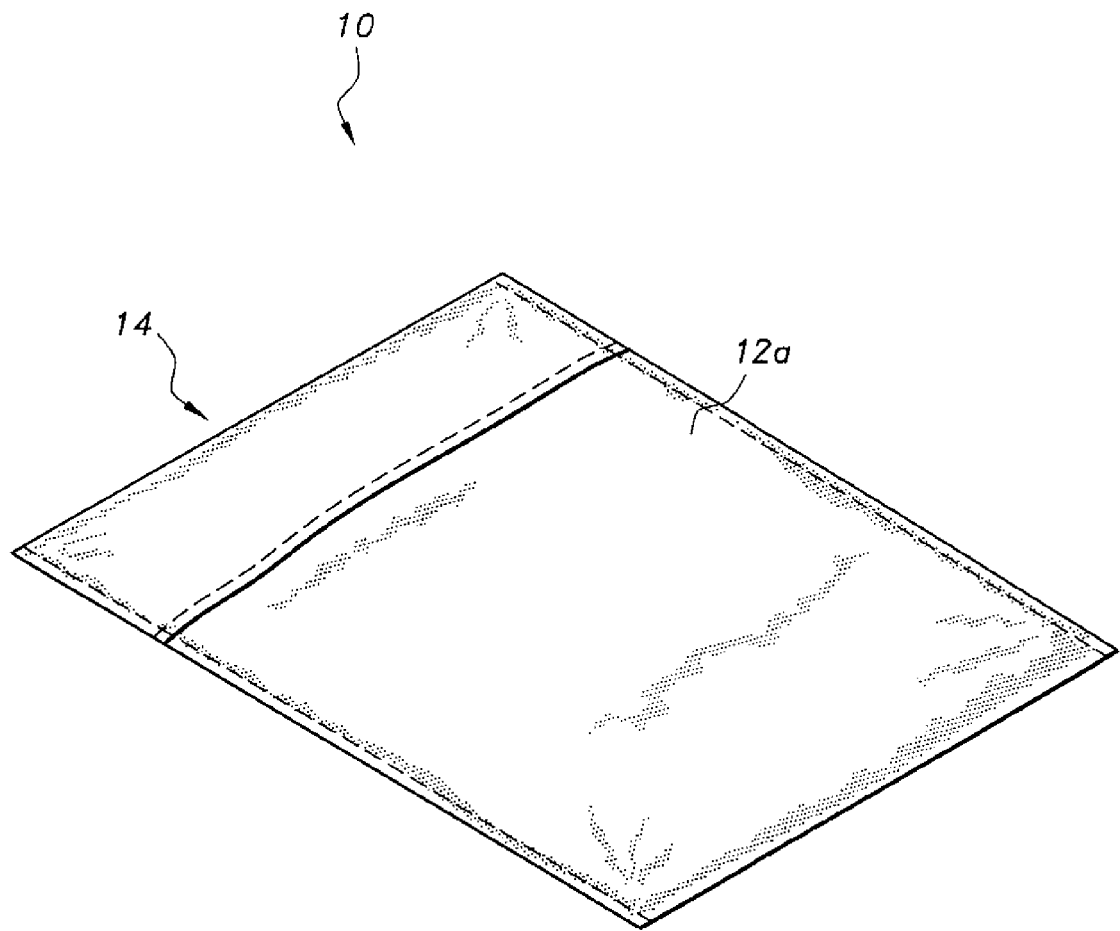
FIG. 3 is perspective view of a single face of a food drainage bag according to the present invention, showing the inner surface.

Referring to FIGS. 1-3, the food drainage bag 10 comprises a receptacle or bag 12 that is completely enclosed, except for an open top 14. The bag 12 may be constructed in any suitable and economical manner. The bag 12 is fabricated from a mesh material having an approximate thread count of 24 threads/cm. The mesh material is a blend of 65% polyester and 35% nylon. The mesh material has a pore size that renders the bag 12 permeable to liquids, but impermeable to solid food materials. This particular blend ratio results in a material that inherently has a high degree of non-stick characteristics. A coating of a non-toxic, non-stick material (e.g., polytetrafluoroethylene) can be added to the inner surface 12a of the bag 12 to further enhance the non-stick characteristics, or a fiber with a non-stick coating may be blended with the polyester and nylon, or a sheet of porous, non-stick material may be laminated to the polyester-nylon mesh material. As presently contemplated, an 8" (width) by 9.5" (height) bag will ideally contain an amount of food that can be easily held and gently squeezed during the draining process. It should be noted, however, that other bag sizes may be employed, if desired. The bag 12 may be made by stitching a seam around three edges of a pair of flat sheets of mesh material, and optionally stitching a hem around the open top of the bag 12; or by joining the sides of a long piece of fabric together, folding it in half and joining those sides together, then stitching a hem around the top; or by joining the two flat, rectangular fabric sheets together along three edges in any conventionally known manner. The bag is more easily cleaned when there is no seam at the bottom of the bag. A loop member 16 is attached to the outer surface of the bag 12 to facilitate hanging the bag 12 on a hook or the like.

In use, the bag 12, having food to be drained therein, is positioned over a receptacle R or the like and gently squeezed to extract or express excess liquid from the food, or the liquid may be naturally drained from the bag without squeezing.

It is to be understood that the present invention is not limited to the embodiments described above, but encompasses any and all embodiments within the scope of the following claims.

I claim:

1. A food drainage bag, comprising a flexible bag having an open top, the bag being fabricated from a mesh material having a blend of 65% polyester and 35% nylon.

2. The food drainage bag according to claim 1, wherein said mesh material has an approximate thread count of 24 threads/cm.

3. The food drainage bag according to claim 1, wherein said bag has a width of 8 inches and a height of 9.5 inches.

4. A food drainage device, comprising a flexible bag having an open top and an inner surface and an outer surface, the bag being fabricated from a mesh material having a blend of 65% polyester and 35% nylon and having an approximate thread count of 24 threads/cm.

5. The food drainage device according to claim 4, wherein said bag has a width of 8 inches and a height of 9.5 inches.

6. The food drainage device according to claim 4, wherein said inner surface is coated with a nontoxic, non-stick material.

7. The food drainage device according to claim 4, wherein the inner surface is coated with polytetrafluoroethylene.

8. The food drainage device according to claim 4, further including a loop member attached to said outer surface.

9. A food drainage device, comprising:
- a flexible bag having an open top, an inner surface, an outer surface and a seamless bottom, the bag being fabricated from a mesh material having a blend of 65% polyester and 35% nylon and having an approximate thread count of 24 threads/cm;
- a nontoxic, non-stick material coating disposed on the inner surface; and
- a loop member attached to the outer surface, whereby the bag may be hung when not in use.

10. The food drainage device according to claim 9, wherein said bag has a width of 8 inches and a height of 9.5 inches.

11. The food drainage device according to claim 9, wherein said coating comprises polytetrafluoroethylene.

\* \* \* \* \*